Oct. 9, 1923.
H. B. BURT
1,470,524
PROCESS OF MAKING FROZEN CONFECTIONS
Filed Jan. 30, 1922
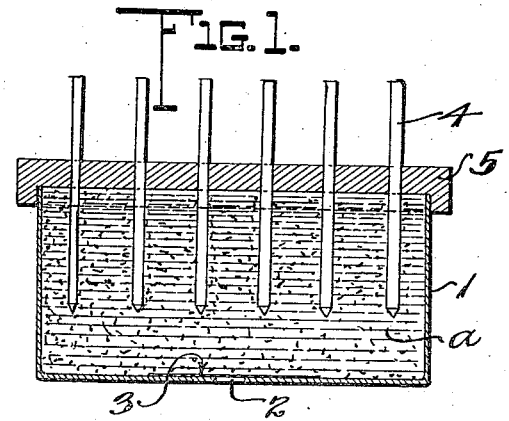
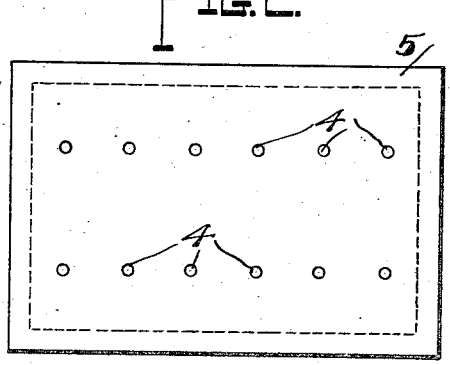
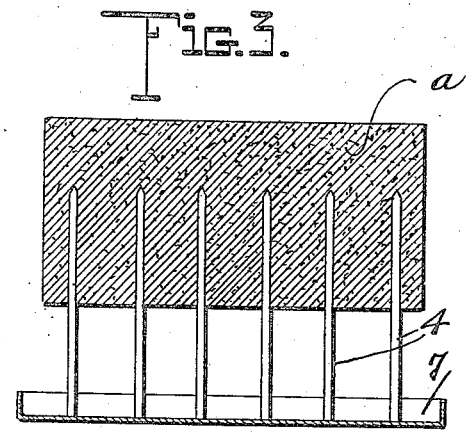
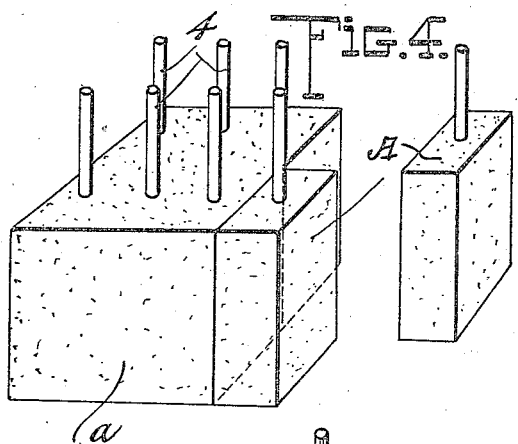
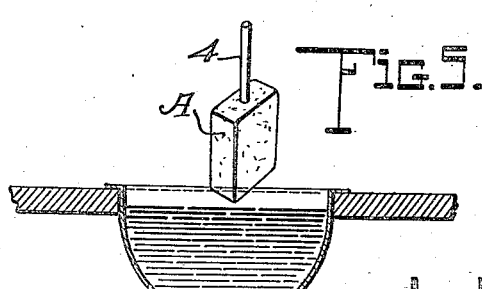
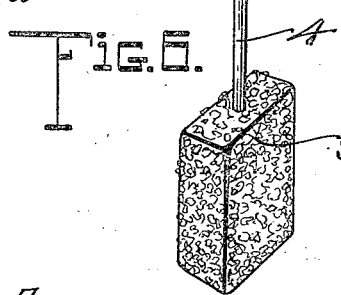
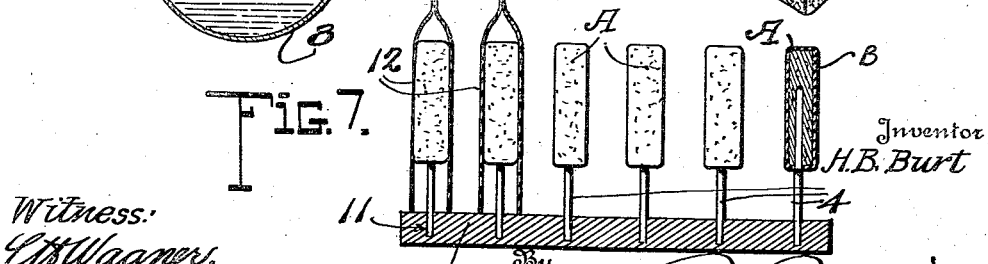
Inventor
H. B. Burt Patented Oct. 9, 1923.

1,470,524

UNITED STATES PATENT OFFICE.

HARRY B. BURT, OF YOUNGSTOWN, OHIO.

PROCESS OF MAKING FROZEN CONFECTIONS.

Application filed January 30, 1922. Serial No. 532,811.

*To all whom it may concern:*

Be it known that I, HARRY B. BURT, a citizen of the United States, residing at Youngstown, in the county of Mahoning and State of Ohio, have invented certain new and useful Improvements in Processes of Making Frozen Confections, of which the following is a specification.

The present invention relates to a method or process for the manufacture of confections of that general character which have a frozen body portion or heart formed of an edible substance which is soft or fluid at normal temperatures and is hardened by refrigeration.

In the manufacture of such confections it is obviously a matter of considerable importance from an hygienic and sanitary viewpoint that the confection be handled with the hands or fingers as little as possible, since aside from the uncleanliness of such an operation there is always a possibility of a dangerous infection of the food. With this thought in mind I have invented a novel process which entirely obviates any necessity for touching the confection with the fingers, either during the process of making the same, or while being handled by the dealer, or eaten by the consumer.

To this end a handle member, which may or may not be of an edible substance, is suitably attached to the frozen body portion and utilized in the subsequent operations incident to the manufacture of the confection, as well as by the ultimate consumer when eating the confection.

For a full understanding of the process and the various steps incident to carrying out the same, reference is to be had to the following description and accompanying drawings, in which:

Figure 1 is a vertical sectional view through a container which is filled with a partially frozen substance such as ice cream, showing a number of handle members as properly positioned preparatory to a completion of the freezing process.

Figure 2 is a top plan view thereof.

Figure 3 is a side elevation of the completely frozen substance which has been removed from the container and is supported in an inverted position upon the projecting ends of the handle members.

Figure 4 is a perspective view of a portion of a block of the completely frozen substance, illustrating the subsequent step of cutting and dividing the same into small individual sections each of which is provided with one of the handle members.

Figure 5 is a detail view illustrating in a diagrammatic manner the dipping of the individual sections, which may or may not be the next step of the process.

Figure 6 is a detail view illustrating one of the individual sections which has been provided with a protective coating formed of a granulated substance.

Figure 7 is a detail view of the drying stand upon which the individual sections or members are supported after being coated.

The frozen confections which are to be manufactured by this process are of the general nature disclosed and claimed in a copending application filed of even date herewith, and comprise essentially a body portion or core A which is formed of some edible material such as ice cream, sherbet, or the like, which is soft or fluid at normal temperatures and hardens or congeals by refrigeration, the said body portion being provided with a protective outer covering B which need not necessarily be sustaining or form retaining, but which provides an exposed outer surface which is comparatively hard and non-sticky at normal temperatures, so that the confection can be wrapped and handled in the same manner as other candies and confections.

In carrying out the invention, the material or substance *a* from which the body portion of the confection is to be made, is placed in a suitable container 1 while still in a soft or fluid condition, being preferably partially frozen. Ice cream has been found to be a very satisfactory substance from which to make the body portions of these confections, and the ice cream can be placed in the container 1 in the usually soft and partially frozen condition in which it is taken from the freezer in which it is subjected to the well-known churning action. The container 1 preferably has an opening 2 in the bottom thereof for the purpose of permitting the entrance of air when the block of frozen ice cream is removed from the container, and this opening 2 may be covered with a piece of waxed paper 3, or the like, in order to retain the partially frozen and still soft material *a*.

Suitable handle members such as the sticks 4 are properly positioned in the partially frozen substance or ice cream *a* and held in this position while the freezing process is continued and the ice cream or other substance hardened in the well known manner. For the purpose of facilitating the application of the handle members 4 in the proper manner to the partially frozen ice cream, a handle positioning and holding member 5 is applied to the top of the container 1. This member 5 is shown as being in the form of a cover which fits upon the container and is provided with a series of openings 6 which are of a proper size to receive the sticks. The sticks may be inserted within the openings 6 either before or after the cover 5 is applied to the container, and the thickness of the cover is sufficient to hold the sticks in a substantially parallel position and prevent them from being displaced laterally. The consistency of the partially frozen substance a is sufficient to support the handle members or sticks 4 after they have thus been properly positioned, and the container is then placed in a refrigerating chamber or otherwise subjected to a continuation of the freezing operation until after the substance a has been hardened in the desired manner. Where ice cream is used I have found that splendid results are obtained by placing the container with the partially frozen ice cream in a refrigerating chamber having a temperature of about five degrees below zero and permitting it to remain in this chamber for a period of several hours, until it has become sufficiently hard for use.

After the substance a has been hardened by a continuation of the refrigerating process the container is removed from the resulting frozen and hardened block. This may be conveniently accomplished by applying hot water to the exterior of the container and then lifting it from the frozen block where the container is in an inverted position. The provision of the opening 2 in the bottom of the container, as previously mentioned, permits the ready access of air and permits the container to be very readily removed from the frozen block of ice cream or other substance a, after the walls of the container have been heated. This leaves the block of frozen substance a supported upon the projecting ends of the handle members or sticks 4, as indicated by Fig. 3. A suitable support 7 may be placed under the sticks and the block of frozen substance is again placed in a refrigerating chamber for a few minutes in order that the softened outer surface thereof may be hardened.

The frozen composite block is next cut up, either manually or mechanically, into the small individual sections A, each of which is provided with one of the handle members 4. These handle members are now firmly attached to the ice cream or other substance of which the sections A are composed, a very firm bond between the two members having been brought about by the action of congelation. The individual sections A are now manipulated entirely by means of the handles 4 so that there is no need for the fingers of the operator to be brought into contact with the body portion of the frozen confection at any time during the manufacture thereof.

The individual sections A constitute the heart or body portions of the confection and it is preferred that they be provided with an outer protective covering B, said covering being of an edible substance which may serve to flavor the confection, and which is comparatively hard and non-sticky at normal temperatures, so that the covered confection can be handled and eaten like other candies without any need for a dish or spoon. One manner of applying this outer coating B is illustrated diagrammatically by Fig. 5, in which a conventional dipping vessel is indicated at 8. This vessel may contain a quantity of the ordinary milk chocolate coating which is used in dipping candies, and the confection may be dipped into this chocolate while being held by means of the handle 4. Instead of dipping the confection in the chocolate or other material of which the coating is to be formed, a layer of granular substance 9 may be applied to the outer surface of the frozen body portion A. The granular substance may be formed of particles of chocolate, candy, a mixture of nuts and candy, or the like, and these granular members are caused to adhere or stick firmly to the surface of the body portion A in any suitable manner, as by means of congelation. The covering of granular members 9 do not have any sustaining or form retaining function, but provide an outer covering which is relatively hard and non-sticky at normal temperatures, and which may also be of such a character as to impart various delightful flavors to the confection, depending upon the materials or substances which are used in preparing the granules or particles.

In attaching the granules or particles 9 to the body A it may be helpful to first dip the frozen body A into some substance such as clear cream or a very soft edible gelatin, thereby rendering the surface of the body A sticky so that the particles 9 will adhere thereto preparatory to being subjected to further chilling or refrigeration for a sufficient length of time to freeze and solidify the surface and cause the particles or granules to be firmly attached to the body portion by congelation. It may also be possible to bring about a satisfactory union between the granular substance 9 and the body A by first softening the surface of the body by a slight warming, then applying the granular substance and immediately chilling the product to again harden the body portion and bring about a firm bond or union between the body portion and the particles.

After the protective covering B is applied to the body portion A, the individual confection members are supported upon a drying frame or rack, such as that indicated in Figure 7 by the reference character 10. As the rack is illustrated on this drawing, it comprises a board having a series of pockets or recesses 11 formed in the top thereof, said pockets being adapted to receive the ends of the handles 4 and to support the confections in an upright position. The confections are spaced a proper distance apart so that they will not rub against or be brought into contact with each other, and in this condition they are preferably chilled by being placed in a refrigerating chamber for a short period of time. This hardens the surface and the confections are now ready for the market. If desired, they may be provided with a suitable wrapper, and I have found that a very attractive package is provided by slipping envelopes of thin waxed or glazed paper over the confections while they are still upon the drying rack 10. One of these envelopes is indicated at 12, in Figure 7. The confection is produced from start to finish without any need of touching it with the fingers, and it is held by the handle 4 while being eaten, no dish or spoon being necessary. The handles 4 may be of an edible substance, such as hard candy, if desired, and it will be obvious that they can be readily applied to the body portion A by my process. In this connection it may be explained that it would not be practical to apply the handles to the completely frozen and hardened ice cream, since any attempt to force the handles into the hardened ice cream would result in breaking and crumbling the ice cream, and even though by some accident the handles might be inserted, there would be no bond or union between the handles and the ice cream, and the ice cream would not stick to the handles in such manner as to enable it to be supported by the handles while being eaten. For a commercial article it is necessary that the handle and frozen body portion be brought together and a firm bond produced between the members in some manner.

By the term "frozen confection" as it is used in the specification and claims is meant a confection of that general character which is disclosed by the Nelson Patent No. 1,404,539 which was granted on January 24, 1922. These confections have a body portion which is composed of some edible substance, such as ice cream, frozen custard, or water ice which is liquid at normal temperatures and which is frozen to a substantially solid state to prepare it for consumption as a food.

Frozen confections of this character now have a definite status in the art as distinguished from ordinary candy, and the latter does not come within the meaning of the term as it is used here. By the term "normal temperature" is meant the temperature ordinarily encountered in a dwelling occupied by human beings, and ranging from about 60° F. to about 90° F.

Having thus described my invention, what I claim as new and desire to secure by Letters Patent is:

1. The process of making a frozen confection which consists in bringing a handle member in contact with a body of edible substance which is fluid at normal temperatures and subjecting the body to refrigeration whereby it is solidified and thereby attached to the handle by congelation.

2. The process of making a frozen confection which consists in partially freezing an edible substance which is fluid at normal temperatures, applying a handle member to the partially frozen substance, and then continuing the freezing process until the substance is solidified and bonded to the handle member by congelation.

3. The process of making a frozen confection which consists in positioning a plurality of handles in spaced engagement with a body of edible substance which is fluid at normal temperatures, subjecting the body of edible substance to refrigeration until it is solidified and bonded to the handle members, and cutting the solidified body into individual blocks, each of which is provided with one of the handles.

4. The process of making a frozen confection which consists in partially freezing a body of edible substance which is fluid at normal temperatures, positioning a plurality of handles in spaced engagement with the partially frozen substance, continuing the freezing operation until the substance is solidified, and cutting the solidified body into individual blocks, each of which is provided with one of the handles.

5. The process of making a frozen confection which consists in bringing a handle member in contact with a body of edible substance which is fluid at normal temperatures, subjecting the body to refrigeration whereby it is solidified and thereby attached to the handle by congelation, and applying a protective outer coating of a material which is hard at normal temperatures to the frozen body portion while it is supported by the handle member.

6. The process of making a frozen confection which consists in partially freezing a body of ice cream, positioning a plurality of handles in a spaced engagement with the partially frozen ice cream, continuing the freezing process until the ice cream has solidified and attached itself to the handles by congelation, cutting the solidified block into individual pieces each of which is provided with a handle, and applying a protective outer coating of edible substance which is hard at normal temperatures to the individual pieces while they are supported by the handles.

7. The process of making a frozen confection which consists in taking a body of frozen edible material which is fluid at normal temperatures, applying a protective covering of edible granules to the exterior of the frozen body, and subsequently chilling the body to bring about a firm attachment of the granules thereto by congelation.

In testimony whereof I affix my signature.

HARRY B. BURT.